April 21, 1931.  R. H. LAWSON  1,801,280
MECHANISM FOR KNITTING SPLIT FABRIC
Filed June 28, 1928   7 Sheets-Sheet 1
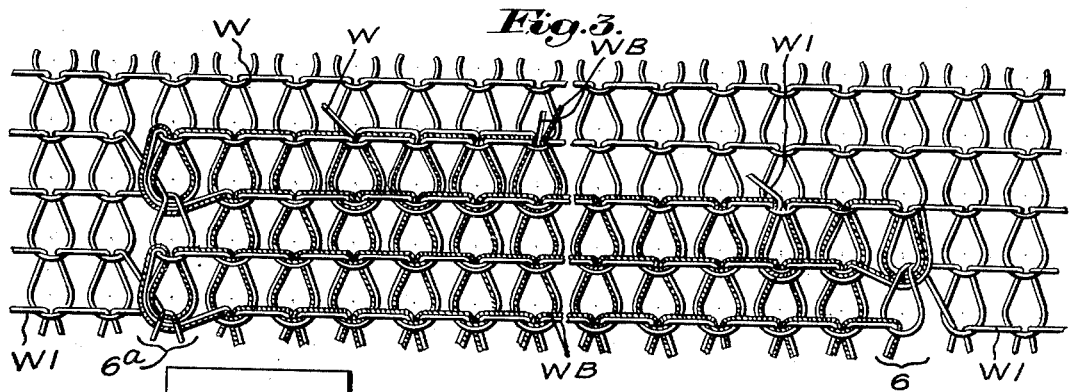
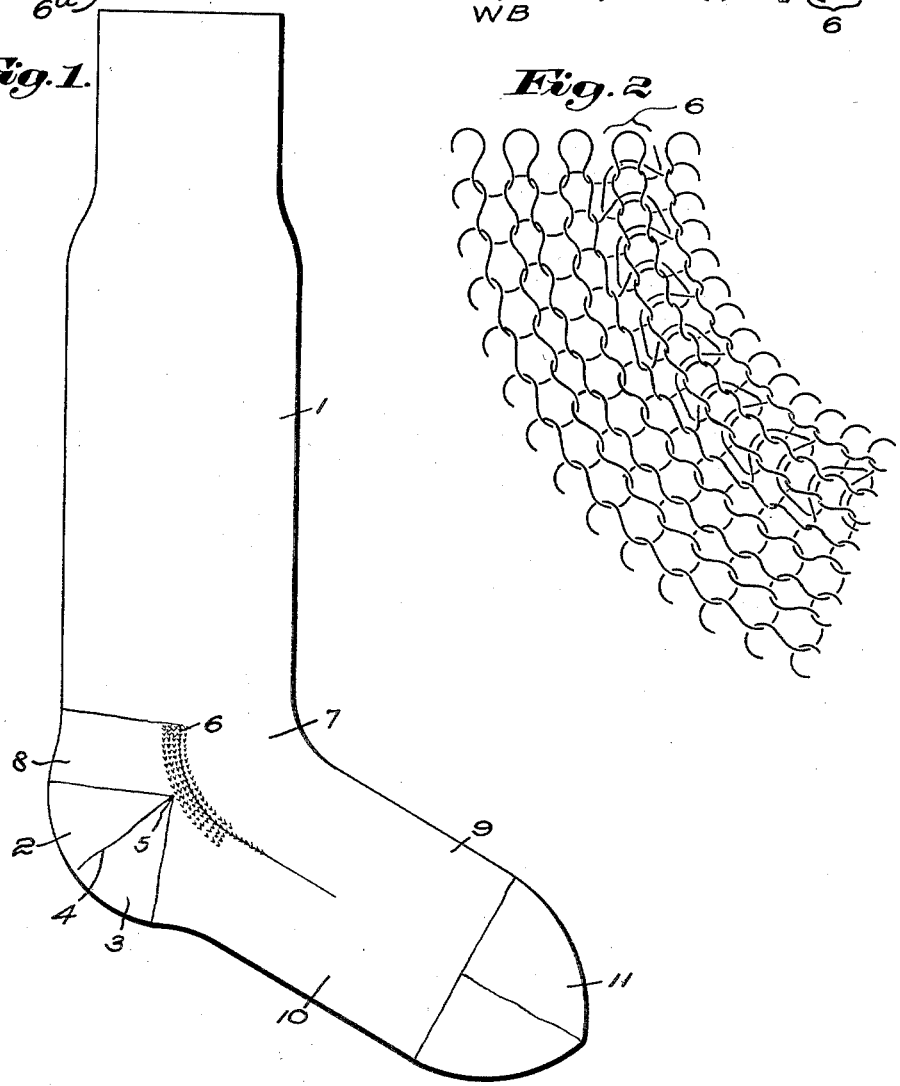
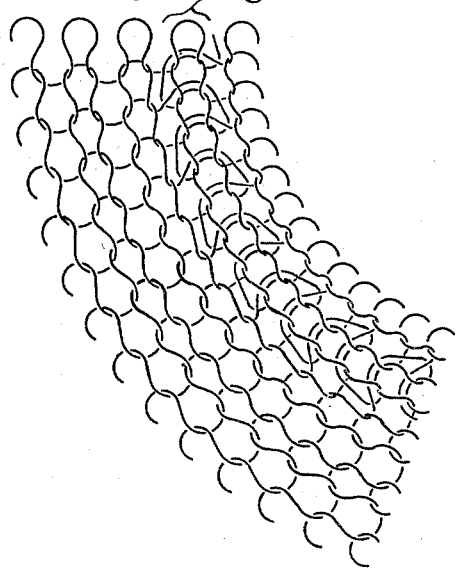
Inventor:
Robert H. Lawson,
by Emery, Booth, Janney and Varney
Attys April 21, 1931. R. H. LAWSON 1,801,280
MECHANISM FOR KNITTING SPLIT FABRIC
Filed June 28, 1928  7 Sheets-Sheet 2
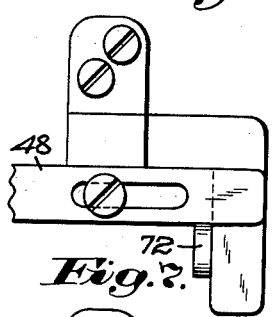
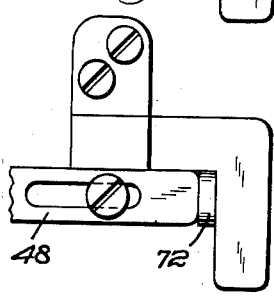
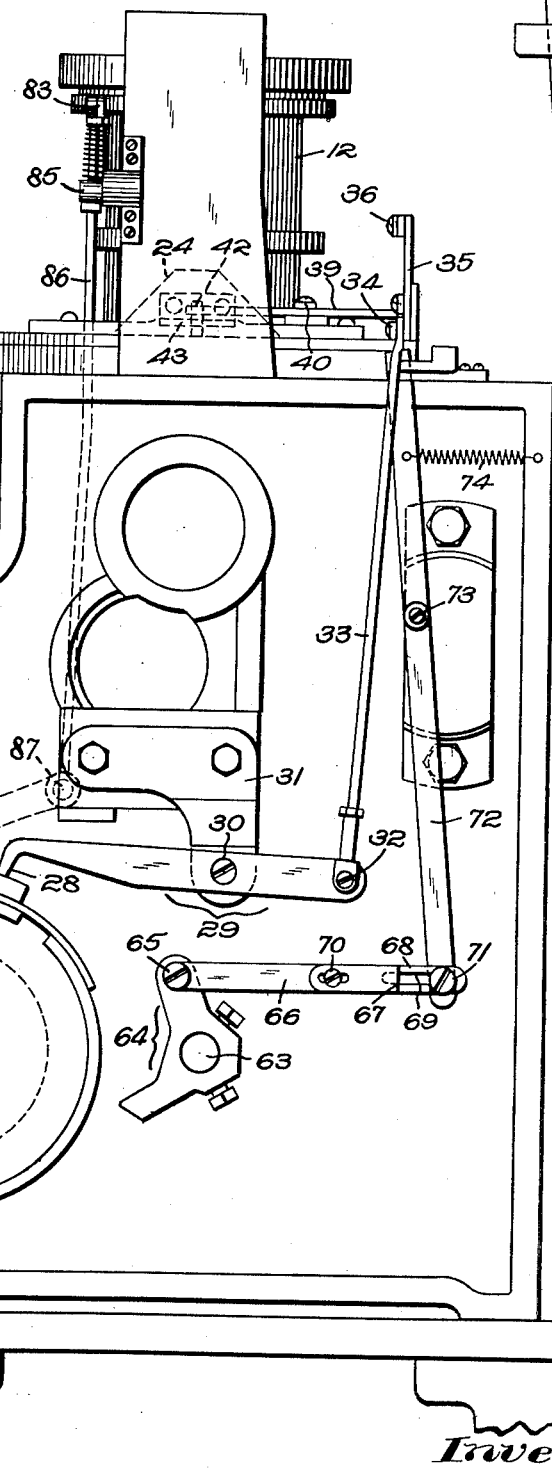
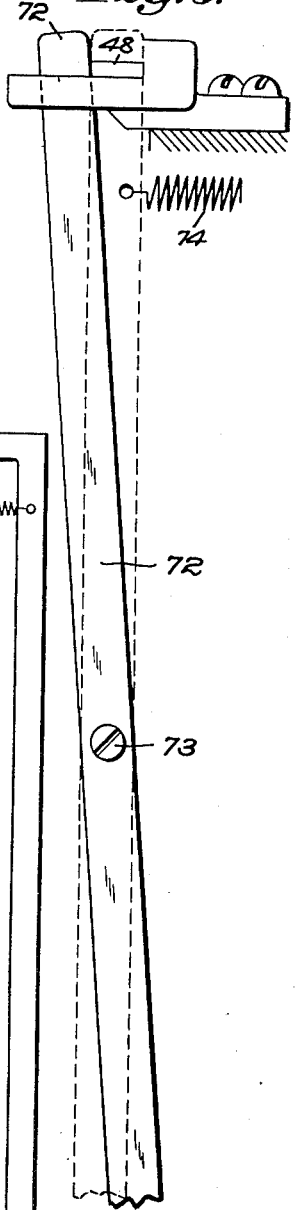
Inventor:
Robert H. Lawson,
by Emery, Booth, James and Varney
Attys Inventor:
Robert H. Lawson, April 21, 1931.  R. H. LAWSON  1,801,280
MECHANISM FOR KNITTING SPLIT FABRIC
Filed June 28, 1928    7 Sheets-Sheet 6

Inventor:
Robert H. Lawson,
by Emery, Booth, Janney and Varney
Attys.

April 21, 1931.  R. H. LAWSON  1,801,280
MECHANISM FOR KNITTING SPLIT FABRIC
Filed June 28, 1928   7 Sheets-Sheet 7

Inventor:
Robert H. Lawson,
by Emery, Booth, Janney and Varney
Attys.

Patented Apr. 21, 1931

1,801,280

UNITED STATES PATENT OFFICE

ROBERT H. LAWSON, OF PAWTUCKET, RHODE ISLAND, ASSIGNOR TO HEMPHILL COMPANY, OF CENTRAL FALLS, RHODE ISLAND, A CORPORATION OF MASSACHUSETTS

MECHANISM FOR KNITTING SPLIT FABRIC

Application filed June 28, 1928. Serial No. 288,856.

This invention relates to mechanism for knitting split fabric.

In order that the principle of the invention may be readily understood, I have disclosed in the accompanying drawings one embodiment of means for carrying out the invention.

In said drawings:

Fig. 1 is a side elevation of a hose or stocking made by the use of the split foot mechanism of this application;

Fig. 2 is a detail, greatly enlarged, showing the stitches or loops of one of the suture seams;

Fig. 3 is a plan, somewhat diagrammatic, illustrating in part several courses of the knitted fabric just prior to and including the commencement of the suture seams;

Fig. 4 is an end elevation of the right hand end of the machine for making the fabric of Figs. 1, 2 and 3;

Fig. 5 is a detail of the locking lever cooperating with the cam for elevating the jacks pertaining to certain of the needles by which the suture seams are knitted;

Figs. 6 and 7 are details in plan showing two positions of parts shown in Fig. 5;

In co-pending application Serial No. 155,655, wherein the present inventor appears as a joint applicant, there is disclosed and claimed the fabric shown in Figs. 1 and 2 as well as the method for making the same. This application is directed to the mechanism for making such fabric, and also to mechanism for causing the introduction of one of the yarns of the split fabric sufficiently in advance of a suture seam to prevent the said yarn from pulling out.

Prior to the invention of the fabric of the application referred to, it has been the practice in making split work hosiery so to position the suture seams that they meet the inner corners or angles of the heel pocket. This frequently resulted in breaks of the fabric at such points, as pointed out in said co-pending application. In accordance with the present disclosure, the split foot suture seams are positioned a few wales, preferably about three, from the respective corners of the heel pocket. Inasmuch as I am the first, so far as I am aware, to devise mechanism for producing such a fabric, I desire to and do claim the same broadly, and therefore it is to be understood that the employment of specific terms is merely for purposes of description and not for limitation.

The fabric, so far as the positioning of the suture seams is concerned, is illustrated in Figs. 1 and 2. In Fig. 1 the leg portion of the hose or stocking is indicated at 1, the narrowed part of the heel at 2, the widened part thereof at 3, the line of suture seams connecting the narrowed and widened part of the heel is indicated at 4, one of the inner corners of the heel at 5, one of the suture seams of the split work at 6, the instep portion of the stocking at 7, the high splice portion thereof at 8, the top of the foot at 9, the bottom thereof at 10, and the toe at 11. It is to be understood that the character of the split work suture seam may be varied, and that the split work suture seam indicated at 6 is shown merely by way of example. In Fig. 2, said suture seam is represented as composed throughout of a loop and a partial loop interknitted with a loop and partial loop. Other types of suture seam may be used instead, as, for example, that disclosed in the patent to Gagne, No. 1,673,764, dated June 12, 1928, wherein a loop and a partial loop is engaged with a single loop only, such interengagement occurring in alternation throughout the suture seams.

Any suitable machine, preferably of the circular type, may be employed for knitting the hose or stocking herein disclosed. I have chosen to illustrate a circular knitting machine of the Banner type disclosed in the patent to Hemphill, No. 933,443, and for details of operation concerning the manufacture of split work hosiery, on circular machines, reference is made to the said patent to Gagne, No. 1,673,764, without, however, limiting the invention in so doing.

Figure 11:
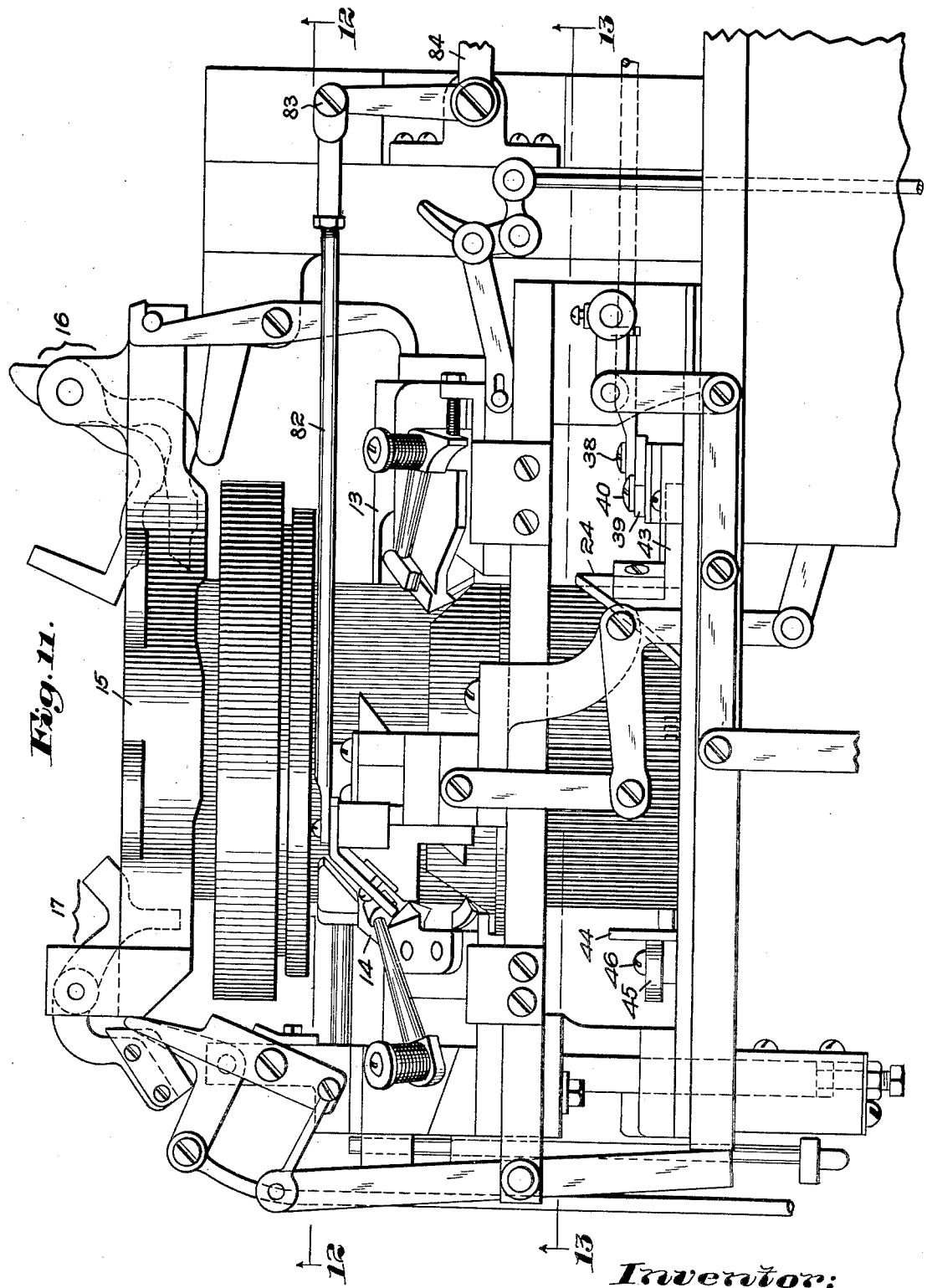
Fig. 11 is a front elevation upon an enlarged scale of the knitting head.

The needle cylinder is indicated at 12, it being rotated in the usual manner for knitting the leg or upper part of the stocking, and being reciprocated not only for the heel and toe, but also for the ankle portion and the foot. To that end, it is provided with the main set of knitting cams, generally indicated at 13 in Fig. 11, and the auxiliary set of knitting cams generally indicated at 14 in said figure. The needles may be of any suitable type, but in the present case I have illustrated a latch ring 15, thus indicating the use of latch needles. The main set of thread guides are indicated generally at 16 and the auxiliary thread guide is indicated at 17.

Figure 14:
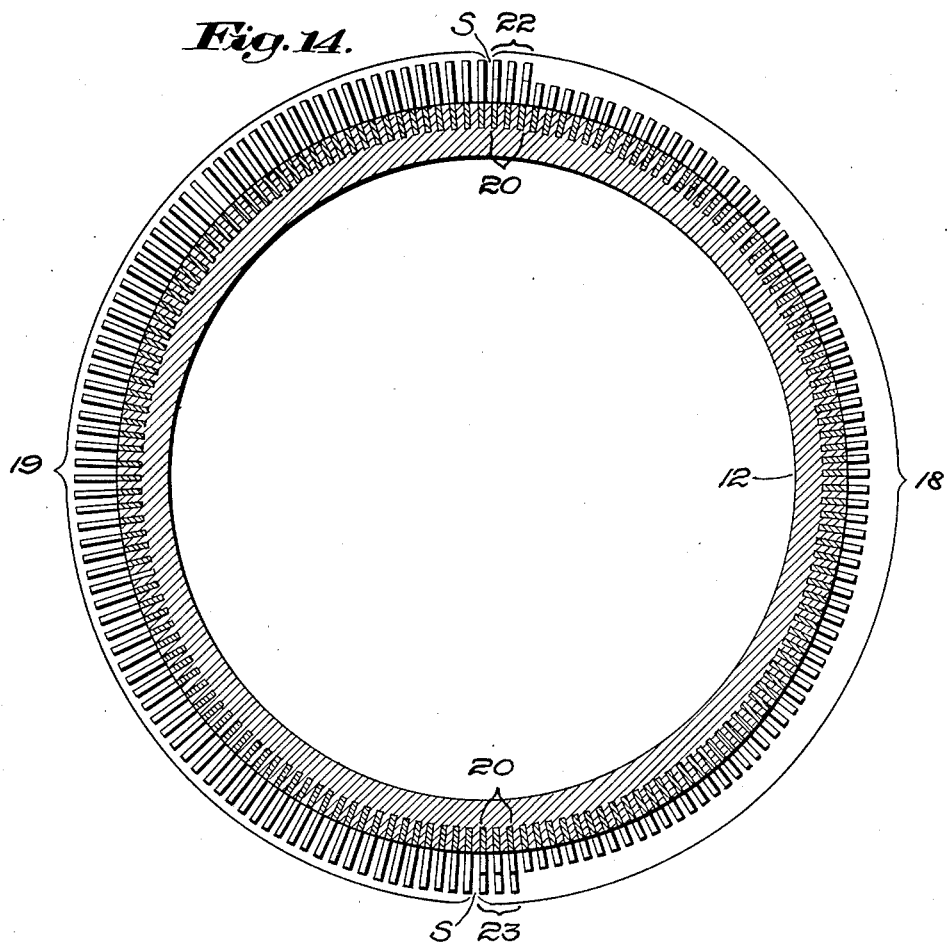
Fig. 14 is a horizontal section taken through the needle cylinder and showing the arrangement of needle butts and certain jacks.

In Fig. 14, I have represented the needle circle without attempting to indicate the actual number of needles employed, as to do so would mean showing the parts upon a very small scale. In said figure, the short butt needles are indicated at 18, being those whereon narrowing and widening are effected for the heel and toe, and the long butt needles are indicated at 19, being the needles at the instep side. Preferably the number of short butt needles is equal to the number of long butt needles. Preferably some small number of the short butt needles at both ends of the short butt series have jacks positioned thereunder or cooperating therewith, so that they may be elevated to take the yarn with the long butt or instep needles. In the present instance, I have shown the last three short butt needles at each end of said series, as indicated at 20, 20, as provided with jacks indicated at 22, 23, and I provide a cam diagrammatically indicated at 24 to act upon said six or other number of jacks so as to cause those needles to be elevated at the main or primary set of knitting cams, as will be evident from an inspection of Fig. 15. Such elevation is, in accordance with the present disclosure, made at the very commencement of the heel.

Figure 13:
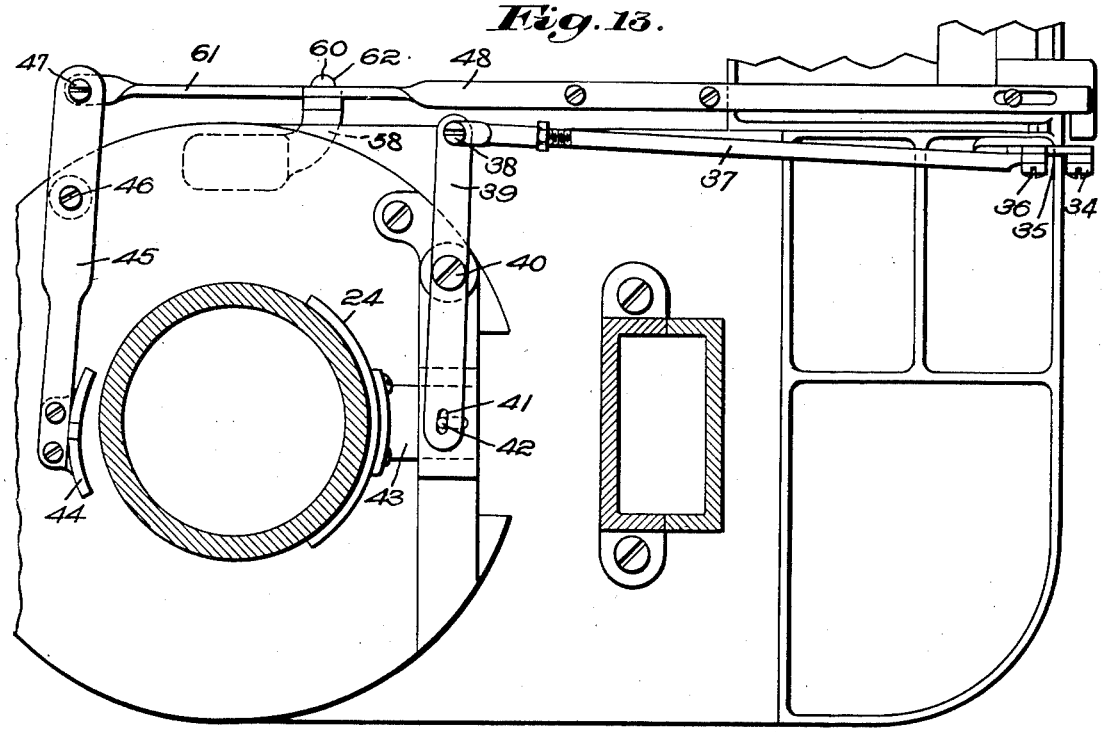
Fig. 13 is a horizontal section on the line 13—13 of Fig. 11.

The said jack cam 24 is shown in its operative position in Fig. 13. Such cam is not, in the present disclosure of the invention, in operative position during rotary work, that is, during the knitting of the leg, but it is in operative position during the knitting of the narrowing part 2 of the heel. For this reason, I provide means for moving said cam 24 into action at the desired time. Without limiting myself thereto, I preferably employ the following mechanism.

Figure 8:
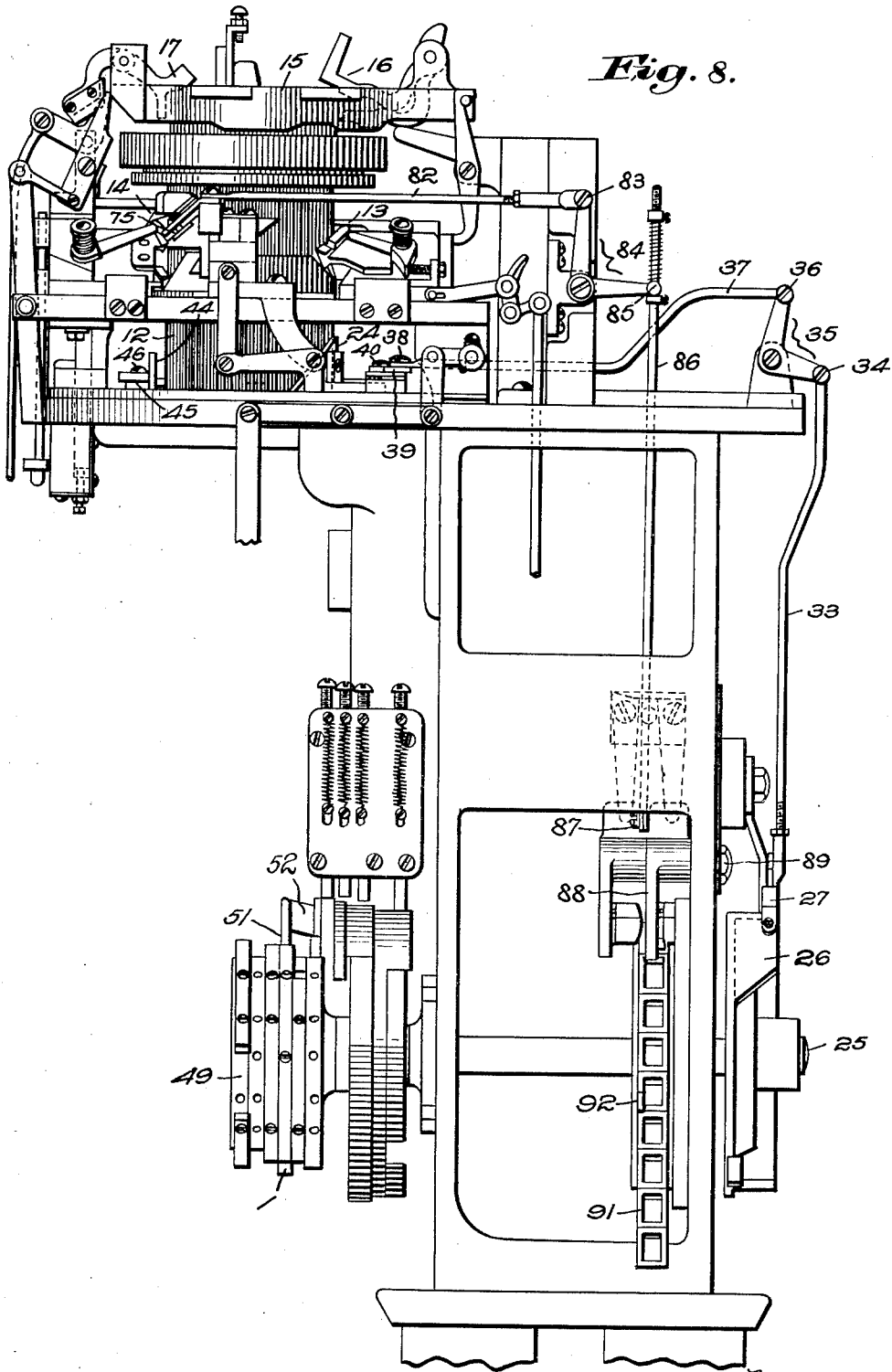
Fig. 8 is a front elevation of the mechanism shown in Fig. 1.

Upon the main pattern shaft 25, as shown most clearly in Figs. 4 and 8, there is fast a disk 26 having thereon at a suitable point a cam 27, most clearly shown in Fig. 4. Said cam is adapted to take under the end 28 of a lever 29 pivoted at 30 upon a bracket 31 attached to the framing. At the opposite end 32 of said lever, there is pivotally connected an upwardly extending link or rod 33, which at its upper end is pivotally connected at 34 to a bell crank lever pivoted at 35 and pivotally connected at 36 to a horizontally extending rod or link 37. The said rod 37 is pivotally connected at its end 38 to a lever 39, itself pivoted at 40 upon the bed plate of the machine. Said lever 39 at its end opposite the link 37 is slotted, as indicated at 41, to receive a pin 42 upon the stem or slide 43 of the jack cam 24. The construction is such that at the desired times, and according to the present disclosure, at the very beginning of the formation of the heel pocket, the said jack cam 24 is moved into operative position, so that it will then act upon and cause the elevation of those needles having the jacks thereunder. Said cam 24 remains in operative position until the narrowing of the heel is completed. At such time (that is, when said jack cam 24 is in operative position), it causes the elevation of the six or other selected number of jacks, 22, 23 with the result that the two suture seams 6, 6a are positioned, in the present instance, each three wales from the adjacent inner corner of the heel pocket, it being understood that the two suture seams are respectively formed upon the two short butt needles indicated at S, S, in Fig. 14.

Preferably, but not necessarily, I provide means for throwing into action an instep yarn of the split work a plurality of stitches in advance of the formation of the first loop of one of the suture seams of the split work, so as to prevent the end of that instep yarn pulling out at the commencement of the suture seam. Herein I have disclosed such a fabric, and have illustrated a cam and controlling means therefor to govern the taking of such yarn at the desired times by the needles in advance of the said first stitch or loop of one of the suture seams.

In Fig. 3, the two suture seams are respectively indicated at 6 and 6a, the fabric being represented as broken away about mid width of said figure. It will be assumed for purposes of description that the body yarn of the stocking is white in color. Such yarn is indicated at W. It will also be assumed that for the instep portion at the part 7, there is employed a white silk yarn, herein indicated at W I. At the high splice part of the stocking, there are employed two yarns, here a white and a blue, which in Fig. 3 are indicated as W B. It will be observed, viewing Fig. 3, that the white and the blue yarns for the instep are thrown into action about one quarter of a course before the formation of the first suture seam loop of the suture seam 6a, (desirably at about the middle of the first partial course of the high splice) and that for a short distance there are three yarns (four loops being herein indicated) in the formation of which three yarns participate. The body yarn W is then withdrawn from action. The remainder of the first partial course of the high splice is completed over to the first loop of the suture seam, then upon the next course of the high splice (the machine now being reciprocated) the instep yarn W I is introduced a few loops (herein three needles) prior to the formation of the other suture seam. As herein disclosed, the said three needles are projected by their jacks as herein described. This is done to prevent said instep yarn W I pulling out, and thus forming an eyelet at the very commencement of the suture seam. Any suitable means may be provided to cause the three or other number of jacks at one of the suture seams to be elevated so as to lift their needles to take said blue and white high splice yarns at an earlier stage as described. Without limiting myself thereto, I have herein disclosed the following mechanism.

Figure 15:
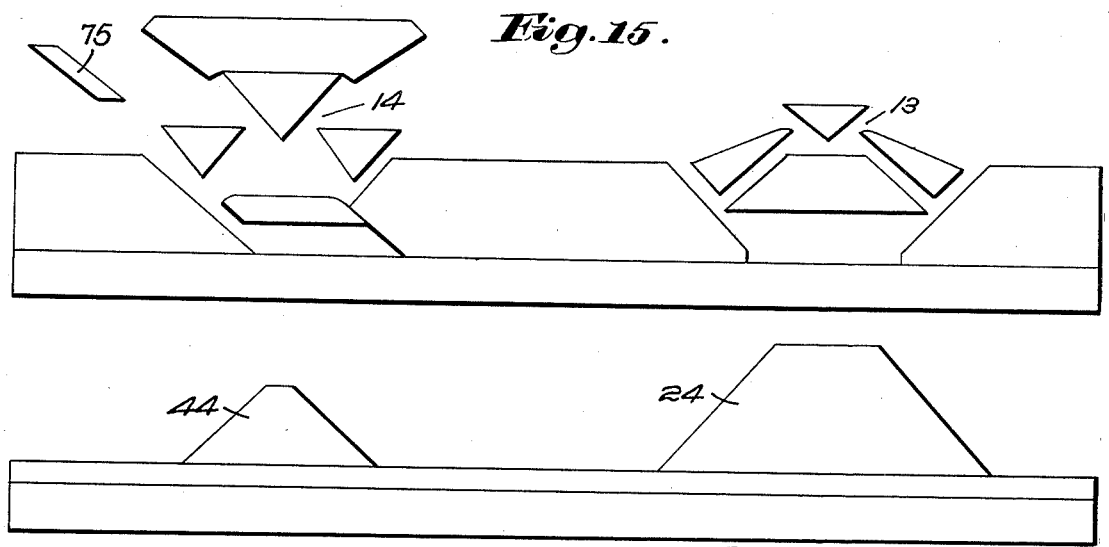
Fig. 15 is a development showing the primary set and the auxiliary set of knitting cams and certain cooperating cams.

In Fig. 13 I have indicated a cam 44 diametrically opposite the cam 24, and in Fig. 15, I have represented said cam as located under the auxiliary set of knitting cams. Said cam 44 has connected thereto a lever 45 pivoted at 46 upon the bed plate, to the outer end of which at 47 is pivotally connected a horizontal rod or link, the purpose of which will presently be described.

Figure 9:
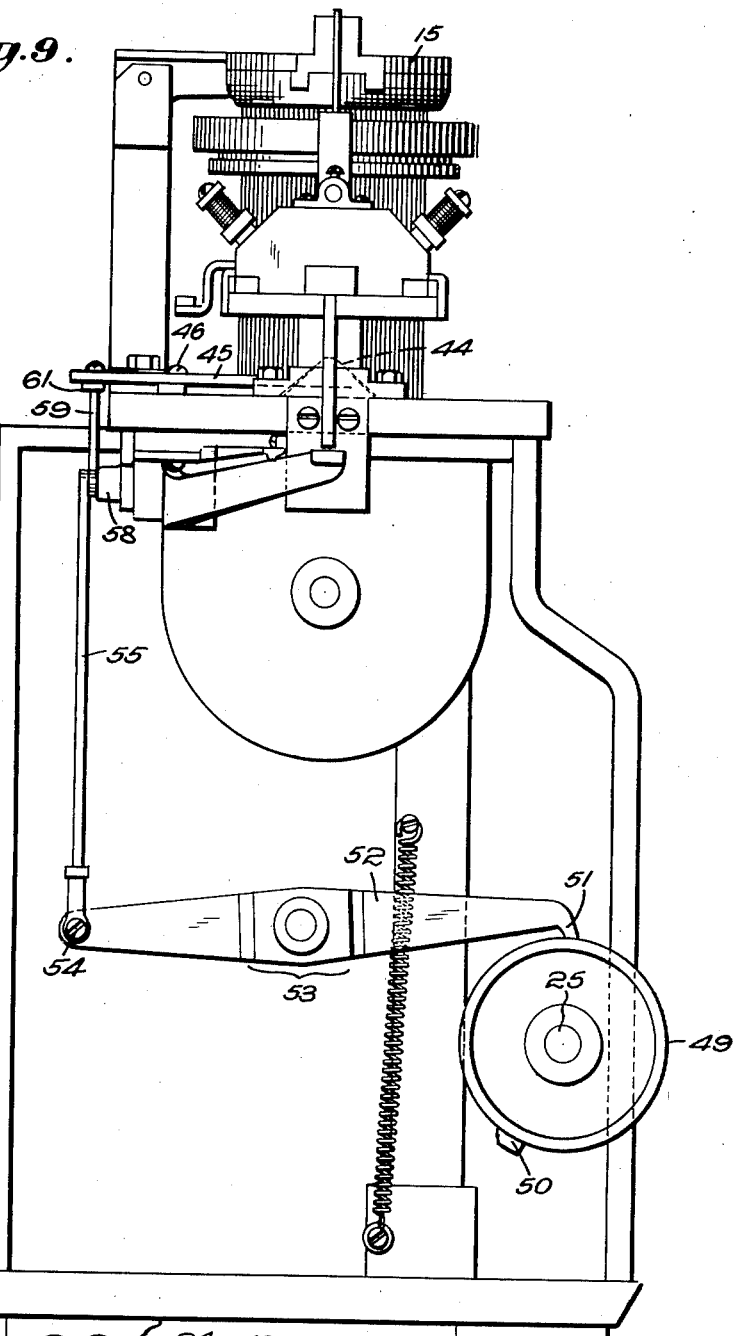
Fig. 9 is a left hand elevation of said mechanism.
Figure 10:
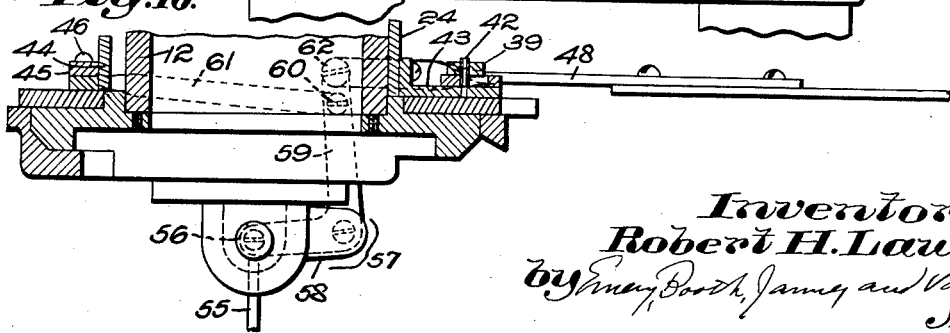
Fig. 10 is a detail in vertical section taken through the base of the needle cylinder and immediately adjacent parts.

Upon the pattern shaft 25 there are fast upon the end opposite the disk 26 a series of annular cam disks, one of which (namely, the cam disk 49) is employed to operate said cam 44. As shown most clearly in Fig. 9, said cam disk 49 is provided with a single cam 50 which, in the rotation of the pattern shaft 25, takes under the end 51 of a lever 52 pivoted at 53 upon the framing. At its opposite end said lever 53 is pivotally connected at 54 to the upright link 55 which, as shown most clearly in Fig. 10, is pivotally connected at its upper end at 56 to an arm of a bell crank lever 57 supported upon a bracket 58 beneath the bed plate of the machine. The upwardly extending arm 59 of said bell crank lever has pivotally connected thereto at 60 a link 61 that is itself connected to the lever 45.

The arm 59 of the bell crank lever 57 is continued upward, as shown in Fig. 10, and is pivotally connected at 62 to the horizontal rod or link 61 heretofore referred to and shown most clearly in Fig. 13. Therefore the movement of the vertical link or rod 55 to throw the cam 44 into action causes movement of the horizontal link 48 to the left viewing Figs. 10 and 13. Said rod or link 48 is adapted to be held momentarily in a certain position through mechanism which will now be described. Upon the quadrant shaft 63, as shown in Fig. 4, and which is constantly rocking during the operation of the machine, there is fast the usual lever 64. Thereto is pivotally connected at 65 a link 66 which terminates at 67, thus providing a shoulder. Underlying said link 66 is another link 68 which is slotted as indicated at 69 and is connected to the link 66 by a screw and slot 70. Received in the slot 69 is the screw 71 upon the lower end of the upwardly extending lever 72 pivoted at 73 upon the framing. The construction is such that as the shoulder 67 strikes the screw 71, it moves the same to the right viewing Fig. 4 and thus swings the lever 72 into the full line position shown in Fig. 5, against the tension of a coil spring 74 connected thereto and to the framing. The said lever 72, when so moved (if the position of the link 48 permits), assumes the position shown in Fig. 7, and thus prevents endwise movement of the said link 48 toward the right viewing Figs. 6, 7 and 13. When, however, said lever 72 is in the position shown in Fig. 6, the link 48 is moved toward the right as shown in Fig. 6.

The purpose of the lever is momentarily to hold the link 48 in the position shown in Fig. 7, so as momentarily only to hold the cam 44 in its inner or operative position. The cam 50 would not of itself hold the cam 44 in position long enough and supplemental means, one type of which I have herein disclosed, is therefore provided for this purpose. Inasmuch as three short butt needles at each end of the series are elevated with the long butt needles, it is necessary to pull all the needles down so as to get the three needles (marked as groups 22, 23) down with the remaining short butt needles 18, so as to have only 120, or one half, the needles in use for the split foot.

Figure 12:
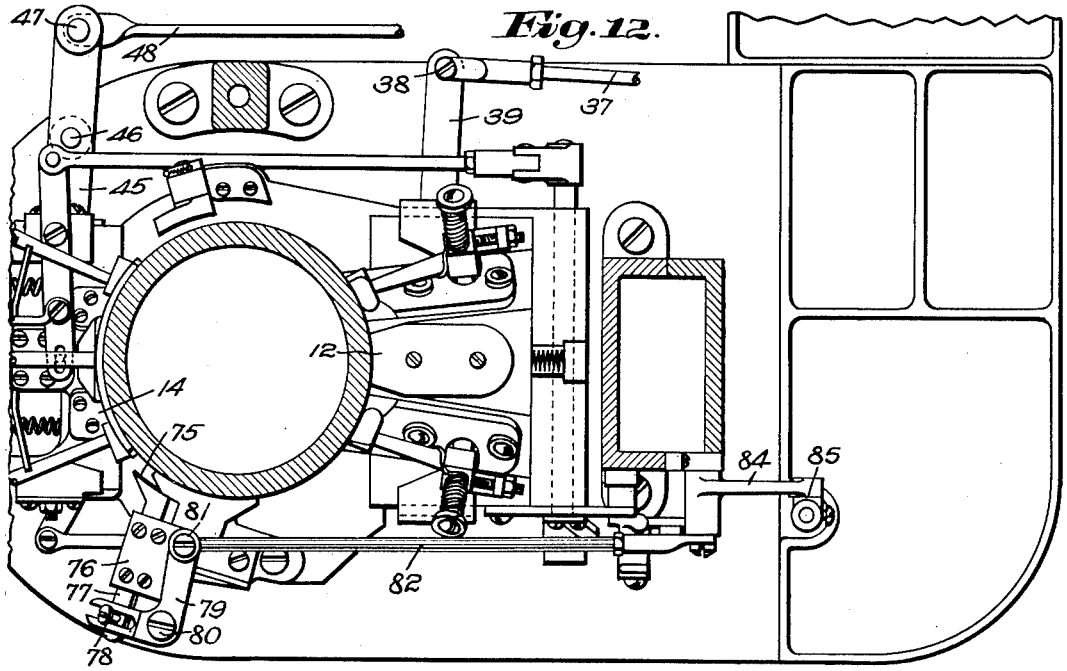
Fig. 12 is a horizontal section on the line 12—12 of Fig. 11 showing certain parts in plan.

I preferably also provide a cam to draw all the needles down the last one or two courses before changing out of the heel into the split foot, though my invention is not limited to its use for such number of courses. For this purpose, I have represented a cam at 75 in Fig. 12 as slidable in a bracket 76 constituting an extension of the instep cam block. Said cam 75 is provided with a stem 77 having a pin 78 engaged by bell crank lever 79 pivoted at 80. Said bell crank lever is pivotally connected at 81 to a horizontal link 82 which is pivotally connected at 83 to the bell crank lever 84. Said lever is suitably pivotally connected at 85 to a vertical link 86 which at its lower end is pivotally connected at 87 to a lever 88 pivoted at 89 in the framing and having a projection 90 adapted to rest upon the main pattern chain 91. Said chain is provided with a special lug 92 which engages the projection 90, and lifting the same moves said cam 75 into action so as to draw all the needles down for the last two partial courses for changing out of the heel into the split foot. Such drawing down of the needles may be for the last course, or any small plurality of last courses.

To make the operation clear, the following recapitulation is given. After knitting the leg portion by round and round knitting at the regular side of the cam block until the point 6 is reached (see Fig. 1), change is made into reciprocating knitting. When changing from round and round knitting into the high splice, the instep cam is moved to its raised position, and this in turn raises all the long butt needles to their raised position, so that they will miss the regular knitting cam block and knit on the auxiliary side only for the instep. In making the high splice, half the needles (the 120 short butt needles) are knitting the high splice on the regular knitting cam block, and the other (the 120 long butt needles) are knitting in the instep on the auxiliary cam block. This operation is continued until the point is reached for changing from the high splice into the heel, and in so doing, in order to reinforce the stocking at the corner of the heel gore, it is necessary to have three jacks on each side under the first three short butt needles. These jacks raise the first three short butt needles to a position which is the same position to which the long butt needles are raised by the instep cam. The raising of the three short butt needles on each side of the long butts makes the heel gore three needles away from the suture seam, leaving a strong three-needle stitch between the suture seam and the heel gore. The heel is made in the regular way, and all the long butt needles and the three short butt needles that are raised with the long butt needles are inoperative throughout the heel. After the heel is finished and in order to change back out of the heel into making split foot work, it is necessary to pull down the said three short butt needles that are raised with the long butt needles, so that they will not knit in on the auxiliary side, since said three needles must be down for the first knitted course after changing out of the heel into the split foot. The split foot is made similar to the high splice, the short butt needles (namely, one half the needles in the cylinder) being used for the sole portion. For knitting the instep, the long butt needles are employed. If the three short butt needles were allowed to stay up with the long butt needles when the change is made out of the heel into the split foot, said three needles would be knitting the silk yarn instead of the mercerized sole yarn. Therefore, at the end of the heel, the cam 75 (Fig. 12) is moved in against the cylinder, thereby pulling to the down position all the needles that were in the raised position. This takes place during the last course knitted contraclockwise before changing from the heel into the split foot, and this in turn brings the short butt needles to the down position, so that they will knit properly on the regular side with the mercerized yarn. The long butt needles are automatically raised to their correct position by the instep cam, so that they will knit properly with the silk yarn on the auxiliary side. After the heel is knitted, the knitting of the split foot proceeds, half the needles (the short butt needles) being used for the sole portion and the other half (the long butt needles) being used for the instep portion. This is continued until the ring toe is reached, the toe being knitted on one half the needles (the short butt needles) and all the long butt needles being in their raised, inactive position.

The described features of the invention are desirably conjointly used but they are capable of separate use, and my invention is therefore not limited to their conjoint use.

Having thus described one illustrative embodiment of my invention, I desire it to be understood that although specific claims are employed, they are used in a generic and descriptive sense and not for purposes of limitation, the scope of the invention being set forth in the following claims.

Claims:

1. Mechanism for producing split work hosiery comprising a primary set of knitting cams, an auxiliary set of knitting cams, means for feeding separate yarns at said knitting cams respectively, means for producing the heel pocket by narrowing and widening, and cooperating means for producing split work suture seams a few wales removed from the corners of said heel pocket.

2. Mechanism for producing split work hosiery comprising a primary set of knitting cams, an auxiliary set of knitting cams, means for feeding separate yarns at said knitting cams respectively, means for producing the heel pocket by narrowing and widening, and cam means for so operating upon predetermined needles that the split work suture seams are removed a few wales from the corners of the heel pocket.

3. Mechanism for producing split work hosiery comprising a primary set of knitting cams, an auxiliary set of knitting cams, means for feeding separate yarns at said knitting cams respectively, means for producing the heel pocket by narrowing and widening, jacks for certain needles at the ends of one of the series of needles, and cam means for operating upon said jacks thereby to present selected needles in such manner as to cause the split work suture seams to be a few wales removed from the corners of the heel pocket.

4. Mechanism for producing split work hosiery comprising a primary set of knitting cams, an auxiliary set of knitting cams, means for feeding separate yarns at said knitting cams respectively, means for producing the heel pocket by narrowing and widening, a circular series of needles composed of long butt needles and short butt needles, and cam means for operating upon a few needles at both ends of the short butt needles in such manner as to cause the presentation of said needles to the split work yarns, whereby the split work suture seams are removed a few wales from the corners of the heel pockets.

5. Mechanism for producing split work hosiery comprising a primary set of knitting cams, an auxiliary set of knitting cams, means for feeding separate yarns at said knitting cams respectively, means for producing the heel pocket by narrowing and widening, and a cam adapted to be in action only during the knitting of the narrowed part of the heel, to cause the elevation of certain needles with the instep needles and thus to position the split work suture seams from the inner corners of the heel the distance of said certain needles.

6. Mechanism for producing split work hosiery comprising a primary set of knitting cams, an auxiliary set of knitting cams, means for feeding separate yarns at said knitting cams respectively, means for producing the heel pocket by narrowing and widening, a circular series of needles one half whereof have long butts and the other half whereof have short butts, a small plurality of jacks associated with a corresponding number of the short butt needles at both ends of the series of short butt needles, and cooperating cam means for so projecting said short butt needles that the split work suture seams are positioned a few wales from the corners of the heel pocket.

7. In split work hosiery mechanism, a primary set of knitting cams, an auxiliary set of knitting cams, means to introduce separate yarns at said cams respectively including means whereby a body yarn is knitted at the primary set of knitting cams and whereby the split work yarns are interknitted in suture seams, and means whereby a split work yarn or yarns is introduced a plurality of wales in advance of the formation of the first loop of a suture seam, thereby preventing pulling out of the yarn, means for producing the heel pocket by narrowing and widening, and cooperating means for producing split work suture seams a few wales removed from the corners of said heel pocket.

8. In split work hosiery mechanism, a primary set of knitting cams, an auxiliary set of knitting cams, means to introduce separate yarns at said cams respectively including means whereby a body yarn is knitted at the primary set of knitting cams and whereby the split work yarns are interknitted in suture seams, and means whereby a split work yarn or yarns is introduced a few wales in one course just prior to the formation of the first loop of the suture seam and the withdrawal of the body yarn, means for producing the heel pocket by narrowing and widening, and cooperating means for producing split work suture seams a few wales removed from the corners of said heel pocket.

9. In a split work, circular knitting machine, a primary set of knitting cams, an auxiliary set of knitting cams, means to introduce distinct yarns at said two sets of cams respectively, means for narrowing and widening to form a heel, and cam means for depressing all the undepressed needles some of which thereafter knit with the heel needles during the knitting of split foot work before changing out of the heel into split foot work, whereby the split work suture seams may be spaced from the corners of the heel pocket.

10. Mechanism for producing split work hosiery comprising a primary set of knitting cams, an auxiliary set of knitting cams, means for feeding separate yarns at said knitting cams respectively, means for producing the heel pocket by narrowing and widening, jacks for certain needles at the ends of one of the series of needles, and cam means for operating upon said jacks at the commencement of the narrowing operation, thereby to present selected needles in such manner as to cause the split work suture seams to be a few wales removed from the corners of the heel pocket.

In testimony whereof, I have signed my name to this specification.

ROBERT H. LAWSON.